United States Patent
Suzuki et al.

(10) Patent No.: US 7,667,759 B2
(45) Date of Patent: Feb. 23, 2010

(54) IMAGING APPARATUS THAT CAN DISPLAY BOTH REAL-TIME IMAGES AND RECORDED IMAGES SIMULTANEOUSLY

(75) Inventors: Takeshi Suzuki, Akiruno (JP); Ayako Narai, Tokyo (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 486 days.

(21) Appl. No.: 11/598,515

(22) Filed: Nov. 13, 2006

(65) Prior Publication Data

US 2007/0109429 A1 May 17, 2007

(30) Foreign Application Priority Data

Nov. 14, 2005 (JP) .............................. 2005-328928
Sep. 6, 2006 (JP) .............................. 2006-241680

(51) Int. Cl.
*H04N 5/222* (2006.01)
(52) U.S. Cl. .............................. 348/333.05; 348/333.11
(58) Field of Classification Search ............ 348/333.05, 348/333.11
See application file for complete search history.

(56) References Cited

U.S. PATENT DOCUMENTS 6,885,392 B1 * 4/2005 Mancuso et al. .............. 348/36
7,187,412 B1 * 3/2007 Silverstein ............. 348/333.01
7,424,218 B2 * 9/2008 Baudisch et al. ............ 396/322

FOREIGN PATENT DOCUMENTS

JP 05-183790 7/1993
JP 2001-024919 1/2001

OTHER PUBLICATIONS

First Office Action for Chinese Patent Application No. 2006101465162, dated Feb. 15, 2008 (5 pgs.), with translation (4 pgs.).

* cited by examiner

*Primary Examiner*—James M Hannett
(74) *Attorney, Agent, or Firm*—Straub & Pokotylo; John C. Pokotylo

(57) ABSTRACT

The imaging apparatus of the present invention can display both real-time images received by an image pickup device and an image(s) recorded on a recording medium at the same time on a display part. The image(s) recorded on the recording medium and to be displayed is selectively switched between image data selected from a recording part in accordance with a shooting instruction and image data selected from the recording part in accordance with an instruction other than the shooting instruction.

6 Claims, 5 Drawing Sheets

IMAGING APPARATUS THAT CAN DISPLAY BOTH REAL-TIME IMAGES AND RECORDED IMAGES SIMULTANEOUSLY

CROSS-REFERENCE TO RELATED APPLICATION

This application is based upon and claims the benefit of priority from prior Japanese Patent Application Nos. 2005-328928, filed on Nov. 14, 2005 and 2006-241680, filed on Sep. 6, 2006, the entire contents of which are incorporated herein by reference.

BACKGROUND OF THE INVENTION

1. Field of the Invention

The present invention relates to a camera having a function capable of displaying an image for viewing a subject before shooting.

2. Description of the Related Art

The liquid crystal display (hereinafter abbreviated as "LCD") provided on the backside or the like of the digital camera is becoming larger in size and higher in definition year by year. Along with this tendency, the amount of information capable of being displayed on one screen is increasing. Making use of such a feature, for example, Japanese Patent Laid-Open No. 2001-24919 proposes displaying a compressed and recorded image in the same quality of a playback mode as well as displaying an image captured with an image pickup device in real-time on a LCD monitor. This proposal allows a user to check at the time of shooting how the image quality is degraded due to the compression.

BRIEF SUMMARY OF THE INVENTION

The imaging apparatus of the present invention can display a real-time image received by an image pickup device and an image recorded on a recording medium on a display part at the same time. The image recorded on the recording medium and to be displayed is selectively switched between image data selected from a recording part in accordance with a shooting instruction and image data selected from the recording part in accordance with an instruction other than the shooting instruction.

As an exemplary structure of the present invention, an imaging apparatus comprises an image receiving part for outputting image data in accordance with a shooting instruction; a recording part for recording image data output from the image receiving part; a display part for displaying image data output in real time from the image receiving part and image data recorded in the recording part at the same time; and a control part for selectively switching the image data recorded in the recording part and to be displayed on the display part between image data selected from the recording part in accordance with the shooting instruction and image data selected from the recording part in accordance with an instruction other than the shooting instruction.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

Figure 1:
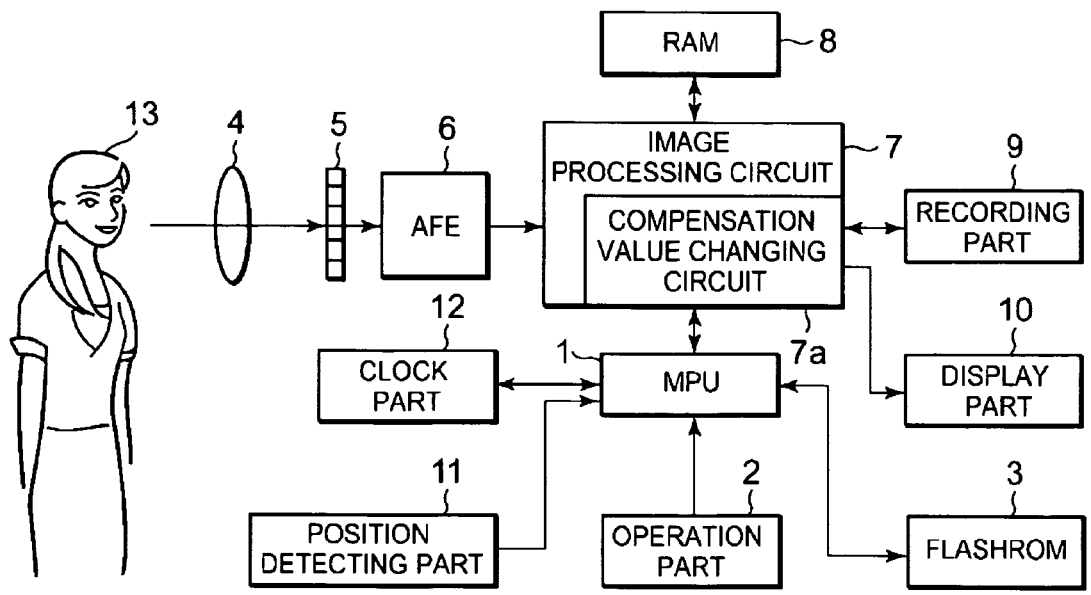
FIG. 1 is a block diagram showing the structure of a camera according to a preferred embodiment of the present invention.

FIG. 1 is a block diagram showing the structure of a camera according to a preferred embodiment of the present invention. The camera shown in FIG. 1 includes an MPU 1, an operation part 2, a flash ROM 3, a photographing lens 4, an image pickup device 5, an analog front-end (abbreviated as "AFE" in FIG. 1) circuit 6, an image processing circuit 7, a RAM 8, a recording part 9, a display part 10, a position detecting part 11, and a clock part 12. The MPU 1 and the image processing circuit 7 constitute a control part.

The MPU 1 consists of a micro-controller and the like, and controls each of the blocks in FIG. 1 to control various sequences of operations such as shooting and playback operations. The operation part 2 is connected to the MPU 1. The operation part 2 includes various operating members provided on the camera. The MPU 1 reads a program from the ROM 3 to control the various sequences of operations according to the states of the operating members that constitute the operation part 2. As an example, the operation part 2 includes a power button for switching the power on and off, a release button for instructing the camera to start an exposure operation, a mode switch for switching the operation mode of the camera between a shooting mode and a playback mode, a quick view button for performing a quick-view operation to be described later, a selection button as a selection part for making various selections and confirming the selections, etc.

The photographing lens 4 forms an image of a subject 13 on the image pickup device 5 provided behind the photographing lens 4. The image pickup device 5 as an image receiving part consists primarily of a CCD sensor or CMOS sensor, converts the image of the subject 13 irradiated through the photographing lens 4 to electric image data, and outputs the electric image data. The output of the image pickup device 5 is read by the AFE circuit 6. The AFE circuit 6 performs various preprocessing on the image data output from the image pickup device 5. The preprocessing includes, for example, noise removal, waveform shaping, amplification, and digital conversion. Digital image data generated by the AFE circuit 6 are input into the image processing circuit 7.

The image processing circuit 7 performs various image processing on the digital image data generated by the AFE circuit 6. In this image processing, for example, at the time of image shooting, color correction, signal compression, etc. are performed. On the other hand, at the time of image playback, decompression, image resizing, etc. are performed on the image data. The image processing circuit 7 includes a compensation value changing circuit 7a for changing compensation values for various corrections in the image processing.

The RAM 8 is a working memory for storing various data including the data processed in the various image processing performed by the image processing circuit 7. For example, the RAM 8 is an SDRAM (synchronous DRAM) or the like. The recording part 9 has records of digital image data compressed by the image processing circuit 7 during shooting.

The display part 10 consists of a liquid crystal display (LCD) and the like. Various images are displayed on the display part 10 under the control of the image processing circuit 7. For example, before shooting, images (hereinafter collectively called a monitor image) based on image data acquired in real time from the image pickup device 5 are displayed sequentially on the display part 10. The user can view the monitor image to check the state of the subject 13. On the other hand, during image playback, digital image data recorded in the recording part 9 are read and decompressed by the image processing circuit 7 so that the decompressed image is displayed on the display part 10.

The position detecting part 11 is, for example, a GPS receiver using a satellite global positioning system (GPS) function. The position detecting part 11 detects the position of the camera using the GPS function and notifies the result to the MPU 1. The clock part 12 is provided for measuring various times, such as a shooting date and time and exposure times during shooting.

The following describes the operation of the embodiment.

Figure 2A:
FIG. 2A is an illustration showing an example of a shot image.
Figure 2B:
FIG. 2B is an illustration showing an example of another image taken with almost the same composition as that in FIG. 2A.
Figure 2C:
FIG. 2C is an illustration showing an example of still another image taken with a composition different from that in FIG. 2A.

Suppose that a user shoots a scene in which similar actions are repeated as shown in FIGS. 2A, 2B, and 2C, or a scene like that of a baby whose facial expression changes every second and occasionally becomes lovely one. In such a case, the user may take many similar photos, and miss a variety of other good photo chances.

For example, after taking a photo as shown in FIG. 2A, if the user takes almost the same photo as that in FIG. 2A, the recording part 9 could run out of capacity in a short time, causing unnecessary camera's battery usages. On the other hand, if the user remembers taking the photo shown in FIG. 2A, the possibility of taking the photo shown in FIG. 2B can be reduced. However, the user getting deeply absorbed in shooting could often not be aware of having already taken a similar photo.

Therefore, the embodiment is to allow the user to be aware of having already taken a similar photo as shown in FIG. 2A at the time of shooting. In other words, the user is urged to take a photo as shown in FIG. 2C, different in composition from that in FIG. 2A, rather than the photo in FIG. 2B that is similar in composition to that in FIG. 2A, allowing the user to make sure with what composition the user wants to take the next photo.

Figure 3:
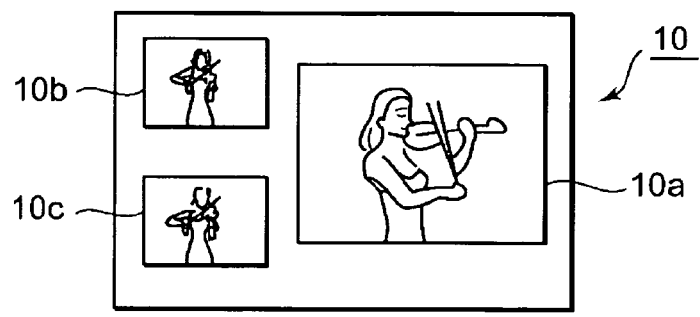
FIG. 3 is an illustration showing an example of how to display on a display part images taken during previous shooting time in the embodiment of the present invention.

For example, as shown in FIG. 3, an image for viewing a subject (that is, a monitor image) 10a is displayed on the display part 10 while displaying the last image 10b (hereinafter called the reference image) shot by the user the last time and recorded in the recording part 9, and an image 10c shot by the user and recorded in the recording part 9 immediately before the last image 10b. This allows the user to compare the monitor image 10a with the reference images 10b and 10c, avoiding taking many pictures with a similar composition as mentioned above.

To provide a display as shown in FIG. 3, the display part 10 can be divided into two parts: one is relatively large for displaying a monitor image, and the other is for displaying reference images. Alternatively, the display part 10 can be configured to have a single part so that an image will be displayed using the overall display area of the display part 10 at normal times. In this case, when a display as shown in FIG. 3 is required, the display area of the display part 10 is divided into two areas, that is, a monitor-image display area for displaying a monitor image and a reference-image display area for displaying reference images. Further, although the two reference images 10b and 10c are displayed on the display part 10 in FIG. 3, the present invention is not limited to the two reference images. The number of reference images can be one, three, or more.

On the contrary, after taking the photo like FIG. 2A, the user may want to take a photo like that of FIG.2B which has almost the same composition as that in FIG. 2A. For example, the use may take a picture in which the subject takes a good pose but unfortunately, the subject's eyes are closed. In this case, the user is likely to want to take a picture of the same subject with a better look in the same pose.

Figure 4:
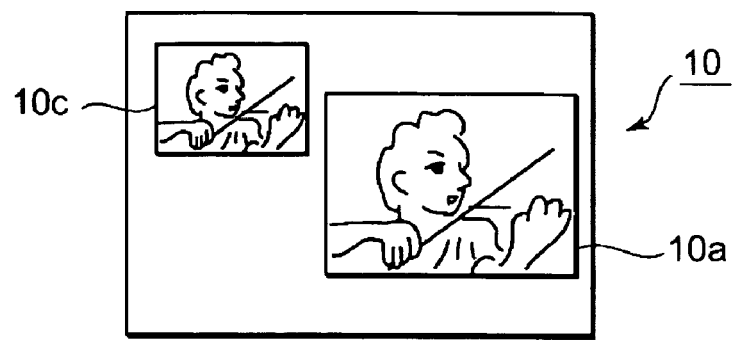
FIG. 4 is an illustration showing an example of how to display on the display part an image a user wants to reference in the embodiment of the present invention.

In such a case, images as shown in FIG. 4 are displayed on the display part 10. In FIG. 4, the reference image 10c is an image the user wants to reference and the monitor image 10a is, like the case of FIG. 3, an image allowing the user to view the state of the subject to be shot by the user. The user can compare the monitor image 10a with the reference image 10c before shooting, allowing the user to take a photo with the same composition as the reference image.

Figure 5:
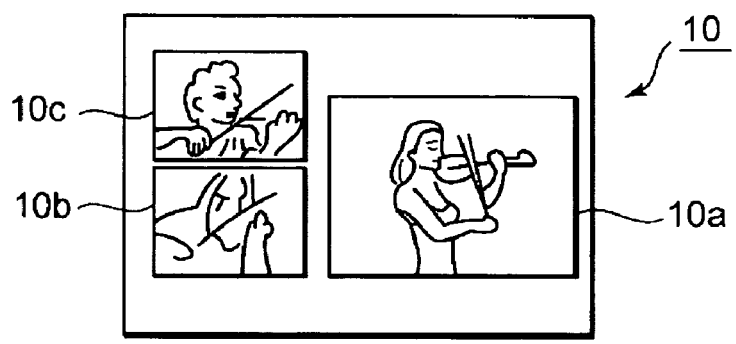
FIG. 5 is an illustration showing an example of how to provide the display shown in FIG. 3 and the display shown in FIG. 4 at the same time in the embodiment of the present invention.

Note that, although the number of reference images displayed in FIG. 4 is one, the number of reference images can be two or more as shown in FIG. 3 and 5.

FIG. 5 shows an example of a case where the display in FIG. 3 and the display in FIG. 4 are provided at the same time. In FIG. 5, the image 10a is a monitor image allowing the user to view the state of the subject to be shot, the image 10b is the last shot image, and the image 10c is an image the user wants to reference. This kind of split-view display enables the functions as described in FIGS. 3 and 4 to be implemented in a single display part.

Figure 6:
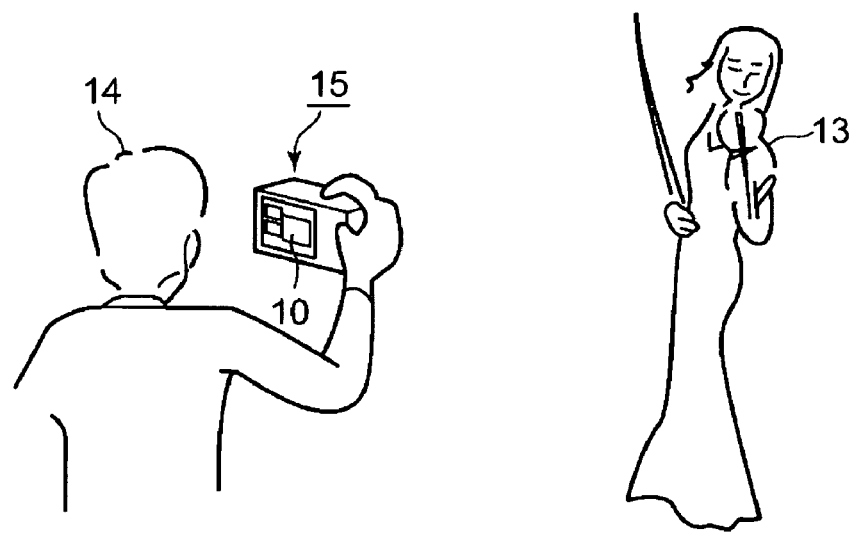
FIG. 6 is an illustration showing how to use the camera according to the embodiment of the present invention.

As shown in FIG. 6, as a result of providing the above-described display on the display part 10, a user 14 can take a picture of the subject 13 while comparing the monitor image and the reference image(s) on the display part 10 provided on a camera 15, enabling the user to take a desired picture.

Figure 7:
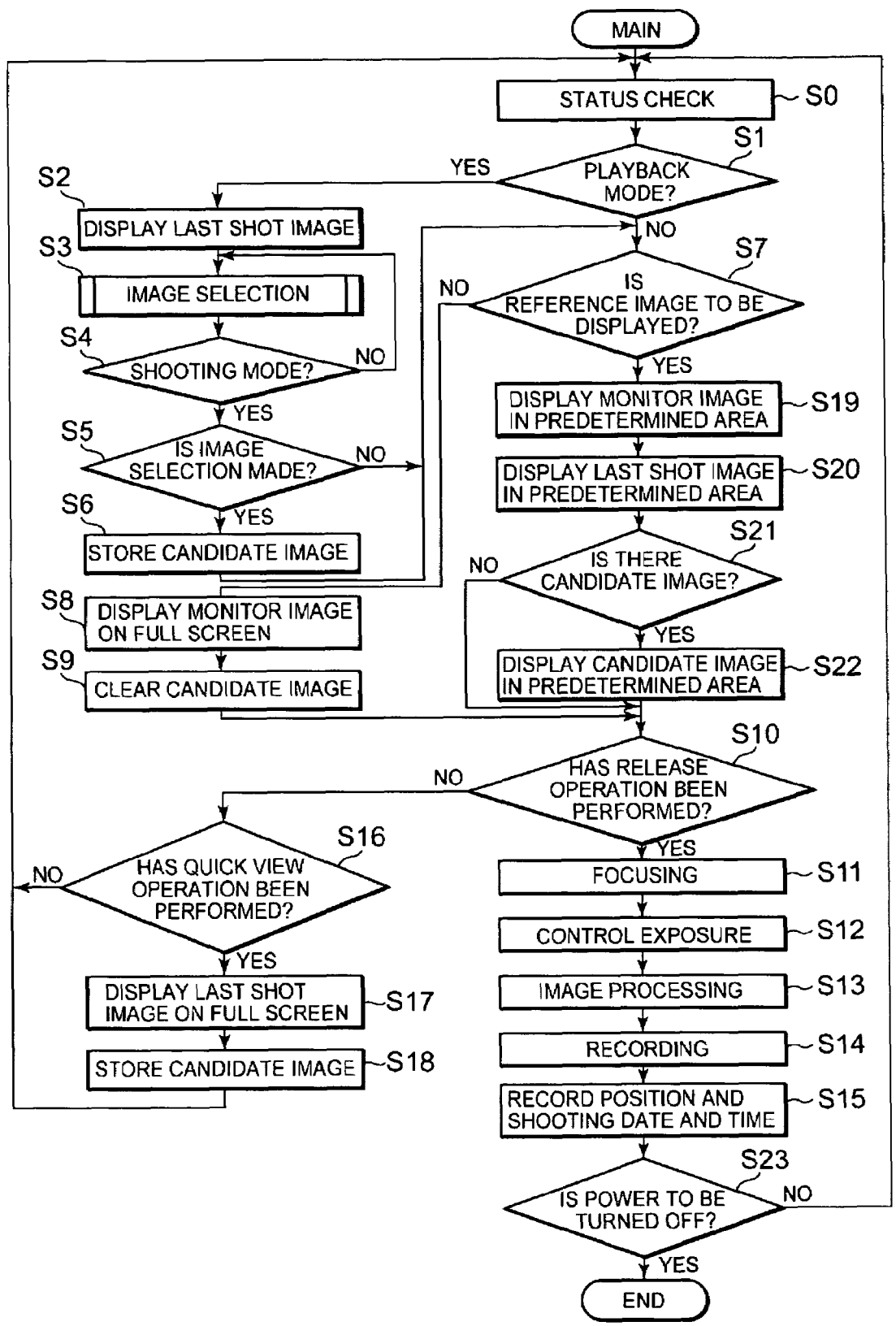
FIG. 7 is a flowchart showing the main control of the camera according to the embodiment of the present invention.

FIG. 7 is a flowchart of the main control of the camera including the above-mentioned display control according to the embodiment of the present invention. The processing of the flowchart of FIG. 7 is executed by the MPU 1 according to a program recorded in the ROM 3 as a recording medium. In the flowchart of FIG. 7, the MPU 1 performs various control based on the state of each of switches according to the user's operations on the operation part 2. A technique for enabling the user to switch the functions set on the operation part 2 through a graphical user interface (GUI) displayed on the display part 10 is widely known. Such a technique can be applied to the camera according to the embodiment of the present invention. If the technique is applied, the number of operating members provided on the camera as the elements of the operation part 2 can be reduced.

In FIG. 7, the MPU 1 checks if there is any change in the status of settings like that of a mode setting by a user's operations (step S0). Then, it is determined whether the operation mode of the camera is a playback mode for displaying images recorded in the recording part 9 (step S1). If it is determined in step S1 that the operation mode is not the playback mode, it is determined to be a shooting mode for taking a picture and the procedure branches from step S1 to step S7.

On the other hand, if it is determined in step S1 that the operation mode is the playback mode, the procedure branches from step S1 to step S2. The MPU 1 then sends instructs to the image processing circuit 7 to make the display part 10 display the image recorded in the recording part 9 at the last shooting (step S2). If the user makes a selection in this status, the MPU 1 sends instructs to the image processing circuit 7 to select an image corresponding to the user's selection from the recording part 9 and display the selected image on the display part (step S3). In this selection process, if the user performs a predetermined operation, a list in which a number of small images called thumbnails are listed on one screen is displayed on display part 10, and an image corresponding to the thumbnail image selected by the user is selected from the recording part 9 and displayed on the display part 10. Alternatively, an image immediately before or after the image currently being displayed on the display part 10 may be displayed at each time the user operates the selection button.

During waiting for the selection operation in step S3, the MPU 1 determines whether the operation mode of the camera switches from the playback mode to the shooting mode (step S4). If it is determined in step S4 that the operation mode has not changed to the shooting mode, the procedure returns from step S4 to step S3.

On the other hand, if it is determined in step S4 that the operation mode has changed to switch to the shooting mode, the procedure branches from step S4 to step S5, in which the MPU 1 determines whether an image selection has made in step S3 (step S5). If it is determined in step S5 that an image selection has made, the procedure branches from step S5 to step S6, in which the MPU 1 stores the selected image in the RAM 8 as a candidate reference image (step S6). Then, the procedure proceeds to step S7. If it is determined in step S5 that no image selection has made, the procedure goes to step S7 without storing the image in the RAM 8.

On the other hand, if it is determined in step S1 that the operation mode is the shooting mode, or if NO in step S5, or after S6, the MPU 1 determines whether a setting to display a reference image(s) on the display part 10 has made by the user's operation (step S7). The setting can be made by the user's operation on the operation part 2. In this sense, the operating part 2 can be named as a display switching member. If it is determined in step S7 that the selected option is not to display a reference image(s), the procedure branches from step S7 to step S8, in which the MPU 1 instructs the image processing circuit 7 to display, on the full screen of the display part 10, the monitor image based on a real-time image of the subject 13 acquired before shooting from the image pickup device 5 through the photographing lens 4 (step S8). The processing in step S8 allows the user to view the subject 13 on a large screen. After step S8, the MPU 1 clears the candidate image recorded in the RAM 8 (step S9).

Then, the MPU 1 determines whether the user has performed a release operation to instruct shooting (step S10). If it is determined in step S10 that the user has performed the release operation, the procedure branches from step S10 to step S11 to execute a normal camera shooting sequence. Namely, the MPU 1 adjusts the focus of the photographing lens 4 through an autofocus mechanism, not shown, (step S11), and controls the exposure to image pickup device 5 using a shutter (not shown) or the like (step S12). Then, image data obtained as a result of the exposure control in step S12 is subjected to image processing, such as color correction and compression, performed by the image processing circuit 7 (step S13), and the processed image data are recorded in the recording part 9 (step S14). The position detected by the position detecting part 11 and the shooting date and time detected by the clock part 12 are also recorded in the recording part 9 in association with the image data recorded (step S15). After that, it is determined whether the status of the camera proceeds to power off status (step S23). If the status does not proceed to the power off status, that is, for example, if a predetermined period of time has not elapsed in an input waiting state, or the power-off operation has not been performed, the procedure returns to step S1.

On the other hand, if it is determined in step S10 that the user has not performed the release operation, the procedure branches from step S10 to step S16 to determine whether a quick-view operation has been performed by pressing a quick view button or the like (step S16). If it is determined in step S16 that the quick-view operation has not been performed, the procedure returns from step S16 to step Si. On the other hand, if it is determined in step S16 that the quick-view operation has performed, the procedure branches from step S16 to step S17 to send instructions to the image processing circuit 7 to select the last recorded shot image from the recording part 9 and make the display part 10 display the selected image on the full screen of it (step S17). In this quick-view operation, the user can operate the selection button or the like to change the image to be displayed on the display part 10. Such a quick-view operation allows the user to check any shot image even not in the playback mode. Then, following step S17, the MPU 1 stores the image currently selected by the user in the RAM 8 as a candidate reference image (step S18). After that, the procedure returns to step S1.

If it is determined in step S7 that the reference image is to be displayed, the procedure branches from step S7 to step S19, in which the MPU 1 first sends an instruction to the image processing circuit 7 to display the monitor image in a predetermined area of the display part 10 as indicated by reference numeral 10a in FIG. 5 (step S19). Then the MPU 1 sends another instruction to the image processing circuit 7 to display the last shot image recorded in the recording part 9 as a reference image in another predetermined area of the display part 10 as indicated by reference numeral 10b in FIG. 5 (step S20).

Next, the MPU 1 determines whether any candidate image is stored in the RAM 8 (step S21). If it is determined in step S21 that a candidate image is stored, the procedure branches from step S21 to step S22, in which the MPU 1 sends an instruction to the image processing circuit 7 to display the candidate image as a reference image in a predetermined area of the display part 10 as indicated by reference numeral 10c in FIG. 5 (step S22). After that, the procedure goes to step S10. On the other hand, if it is determined in step S21 that no candidate image is stored in the RAM 8, the procedure goes to step S10 skipping step S22.

The above-mentioned processing allows the user to compare the monitor image with the last shot image and/or an image selected as a reference image on a user's preferred multi-picture screen so that the user can check the composition of an image to be shot next.

The image displayed in step S20 of FIG. 7 on the display part 10 as the reference image is updated each time shooting is instructed. Thus the last image is displayed on the display part 10 to help the user avoid shooting the image shown in FIG. 2B following the image shown in FIG. 2A. This allows the user to avoid taking similar photos and hence waste of energy or storage capacity of the recording part 9.

On the other hand, an image selected according to a user's instruction different from the shooting instruction, for example, an image selected by the user in the playback mode or in the quick-view operation is selected as a candidate image and displayed in step S22 of FIG. 7. This allows the user to take the next shot with almost the same composition as the image selected by the user for reference.

In the embodiment, although the image displayed as the image 10b is described as the last shot image recorded in the recording part 9, it can be configured such that several previously-shot images are displayed. Further, the shooting instruction mentioned above can include an instruction associated with shooting based on the selection of the shooting mode and any other specific shooting instruction as well as the instruction associated with shooting based on the user's release operation. In this case, these shooting instructions can be judged in step S10.

Further, in the embodiment, although the candidate reference image displayed in the processing step S22 is the image selected by the user in the playback mode, the present invention is not limited to such an image, and it can be configured that an image automatically selected by the camera under predetermined conditions is also displayed as the candidate reference image. For example, by using positional information detected by the position detecting part 11, if the recording part 9 stores an image taken before at the same place as the current position, the stored image can be handled as the candidate reference image. Alternatively, by using the shooting date and time detected by the clock part 12, if the recording part 9 stores an image taken around the same time as the current date or time, the stored image can also be handled as the candidate reference image. Further, at the time of recording an image, information on the reference image such as a file name can be recorded in the recording part 9 as supplementary information. This allows the user to check back on the image he or she referred to in the past.

Figure 8:
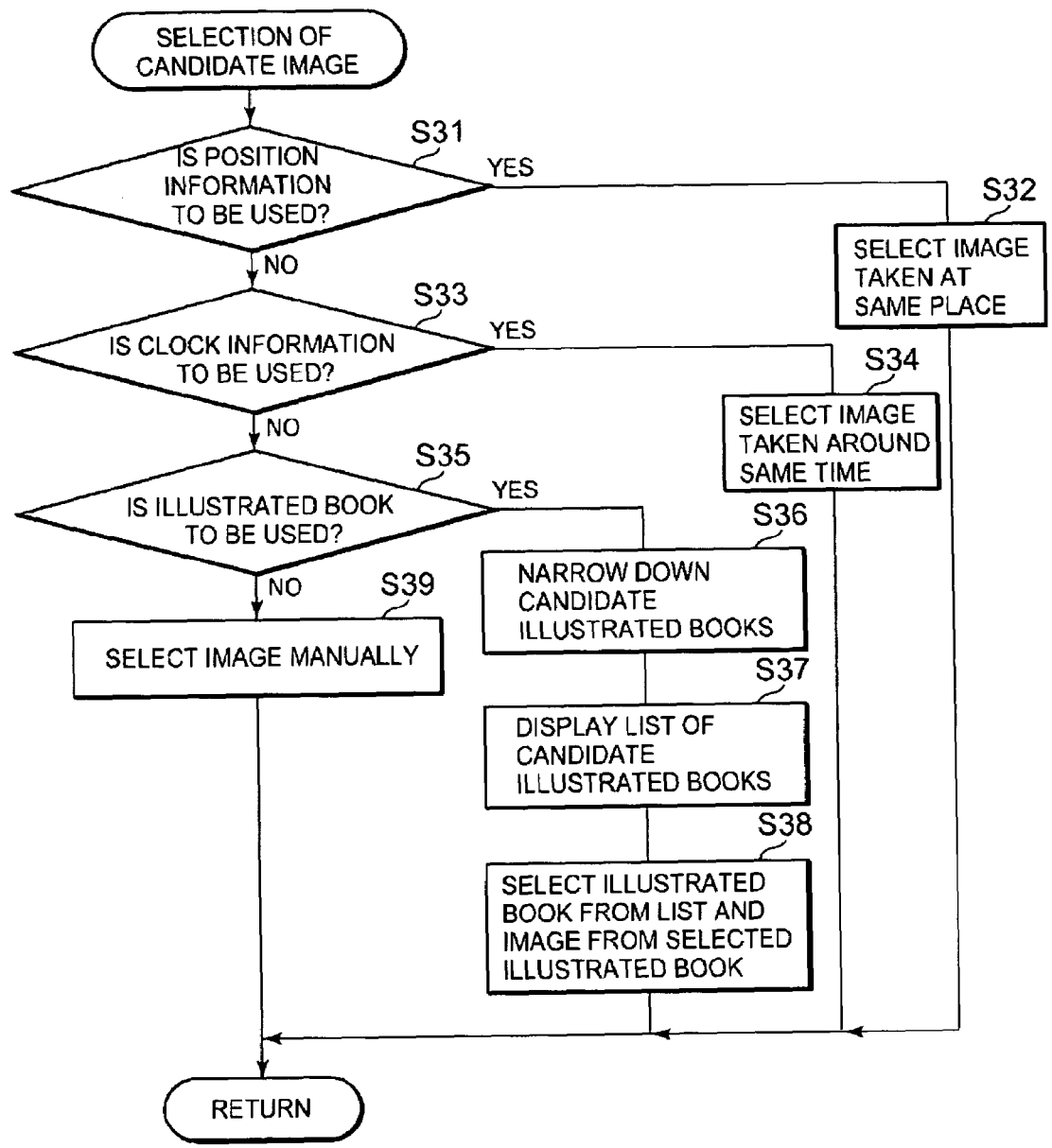
FIG. 8 is a flowchart showing selection processing for a candidate image.

FIG. 8 is a flowchart showing selection processing for a candidate image. This processing is executed instead of step S21 in FIG. 7.

In FIG. 8, the MPU 1 determines whether it is set that the position information from the position detecting part 11 is used to select a candidate image (step S31).

Figure 9:
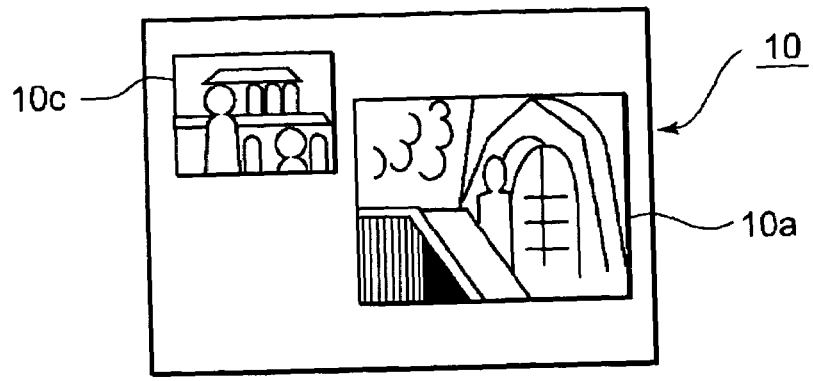
FIG. 9 is an illustration showing an example of display using position information to select a candidate image.

If it is determined in step S31 that the use of the position information from the position detecting part 11 is set, the procedure branches from step S31 to step S32. Then, the MPU 1 selects an image having the same position information as the current position information detected by the position detecting part 11 as a candidate image from among all the images recorded in the recording part 9 (step S32). After that, the procedure returns from the flowchart of FIG. 8 to step S22 of FIG. 7 to cause the display part 10 to display the selected image. In this case, for example, such a screen as shown in FIG. 9 is displayed. The user can compare the monitor image 10a with the reference image 10c on the screen shown in FIG. 9 to make a decision, such as to change the current shooting place to another when the current shooting place is the same as the place where the reference image was taken before.

On the other hand, if it is determined in step S31 that the use of the position information from the position detecting part 11 is not set to select a candidate image, the procedure branches from step S31 to step S33, in which the MPU 1 determines whether it is set that the information on the shooting date and time from the clock part 12 is used to select a candidate image (step S33).

Figure 10:
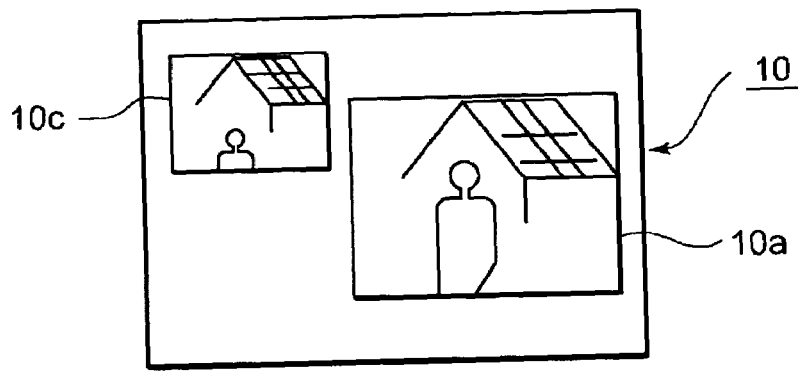
FIG. 10 is an illustration showing another example of display using information on the shooting date and time to select a candidate image.

If it is determined in step S33 that the use of the information on the shooting date and time from the clock part 12 is set to select a candidate image, the procedure branches from step S33 to step S34. Then, the MPU 1 selects an image taken around the same season as the current shooting date or the same time (e.g., in the same month but a different year) as a candidate image from among all the images recorded in the recording part 9 (step S34). After that, the procedure returns from the flowchart of FIG. 8 to step S22 of FIG. 7 to cause the display part 10 to display the selected image. In this case, for example, such a screen as shown in FIG. 10 is displayed. The user can compare the monitor image 10a with the reference image 10c on the screen shown in FIG. 10 to take a picture, for example, of his or her child to keep his or her child's growth record, in similar scenes or the same situation.

On the other hand, if it is determined in step S33 that the use of the information on the shooting date and time from the clock part 12 is not set to select a candidate image, the procedure branches from step S33 to step S35, in which the MPU 1 determines whether use of information on illustrated books recorded in the ROM 3 or the like is set to select a candidate image (step S35).

If it is determined in step S35 that the use of the information on illustrated books is set to select a candidate image, the procedure branches from step S35 to step S36. In this case, the illustrated books are first narrowed down to select a candidate illustrated book (step S36). This narrowing-down processing can be performed, for example, using the position information detected by the position detecting part 11 and the information on the shooting date and time from the clock part 12. For example, if the camera is in water, an illustrated book on fish can be selected as a candidate. On the other hand, if the camera is in a mountain area, illustrated books on wild plants, wild birds, and wild animals can be selected as candidates. In the latter case, those candidates can further be narrowed down depending on the season and the like.

Figure 11:
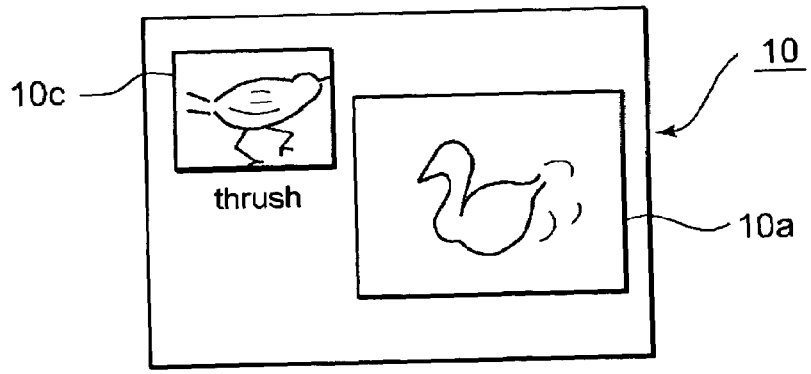
FIG. 11 is an illustration showing still another example of display using information on an illustrated book to select a candidate image.

After selection of a candidate illustrated book(s), the MPU 1 causes the display part 10 to display a list of the selected illustrated books (step S37). The user can operate the selection button or the like to select a desired illustrated book from the list and a desired image from the illustrated book. When the user selects an image from the illustrated book selected, the image is set as a candidate image (step S38). After that, the procedure returns from the flowchart of FIG. 8 to step S22 of FIG. 7 to cause the display part 10 to display the image selected. In this case, for example, such a screen as shown in FIG. 11 is displayed. The user can compare the monitor image 10a with the reference image 10c on the screen shown in FIG. 11 to check if the reference image is the same as a subject the user wants to take a picture of.

The information on illustrated books can be prestored in the ROM 3 or the like as a database, or acquired from a database provided on a network such as the Internet. However, access to a database via the network is made available on the precondition that the camera is configured to be connectable to the database via the network. Since network connection techniques are well known, the details are not described in detail here. The use can also call up various reference images from the database such as photo composition samples as well as the illustrated books.

On the other hand, if it is determined in step S35 that it is not set that the information on illustrated books is not used to select a candidate image, the procedure branches from step S35 to step S39. In this case, as described in step S22 of FIG. 7, the image selected by the user and stored in the RAM 8 is selected as a candidate image (step S39).

Thus, the MPU 1 functions to select image data other than the last shot image from the image data recorded in the recording part 9 or the ROM 3 (which can also be considered to be a recording part) so that the image of the selected image data will be displayed. In this sense, the MPU 1 can be called an image selection part. Further, since the MPU 1 performs control to display image data output in real time from the image pickup device 5 as the image receiving part and image data selected by the image selection part at the same time on the display part 10, it can also be called a display control part.

As described above, according to the embodiment, an image for viewing a subject and an image(s) used to be compared with the images for viewing the subject are displayed at the same time using the display part such as a large-sized, high-definition liquid crystal display for monitoring shot images. This allows the user to take better pictures properly by suppressing failures and hence make satisfactory photos or a photo album.

Further, according to the embodiment, an image signal the content of which is changed in accordance with a shooting instruction and an image signal the content of which is changed in accordance with an instruction different from the shooting instruction are displayed properly and simultaneously with image signals output from the image receiving part. This allows the user to take the next picture properly. Thus, the embodiment can provide a camera capable of displaying a reference image(s) together with an image for viewing a subject to allow the user to take the next picture properly.

Note that the number of candidate images displayed can be, of course, more than one. In this case, further effects can be expected at the time of next shooting based on the plurality of images selected at the user's discretion, such as to take pictures along a sequence of narrative compositions associated with the reference images.

While there has been shown and described what is considered to be a preferred embodiment of the invention, it will, of course, be understood that various modifications and changes in form or detail could readily be made without departing from the spirit of the invention. It is therefore intended that the invention not be limited to the exact form described and illustrated, but constructed to cover all modifications that may fall within the scope of the appended claims.

What is claimed is:

1. An imaging apparatus comprising:
   an image receiving part for outputting image data in accordance with a shooting instruction;
   a recording part for recording image data output from the image receiving part;
   a display part for displaying the image data sequentially output from the image receiving part and the image data recorded in the recording part at the same time; and
   a control part for controlling such that (1) the image data selected from the image data recorded in the recording part in accordance with the shooting instruction, and the image data output from the image receiving part in real time are displayed on the display part at the same time, and (2) the image data selected from the image data recorded in the recording part in accordance with an instruction other than the shooting instruction, and the image data output from the image receiving part in real time are displayed on the display part at the same time,
   wherein the recording part further stores a record of image data as a database for reference used at the time of shooting, and
   the image data selected from the recording part in accordance with the instruction other than from the shooting instruction are image data searched from the database.

2. The imaging apparatus according to claim 1 further comprising a selection part for selecting image data from image signals recorded in the recording part,
   wherein the image data selected from the recording part in accordance with the shooting instruction is image data recorded at the last shooting.

3. The imaging apparatus according to claim 2 wherein the control part controls the display part to simultaneously display image data output in real time from the image receiving part, the image data recorded in the recording part in accordance with the shooting instruction, and the image data selected by the selection part.

4. The imaging apparatus according to claim 2 wherein the selection part makes a selection in a playback mode in which the image data recorded in the recording part are played back.

5. The imaging apparatus according to claim 2 wherein the selection part makes a selection when a playback-display of an image is performed in a shooting mode for shooting images.

6. An imaging apparatus comprising:
   an image receiving part for outputting image data in accordance with a shooting instruction;
   a recording part for recording image data output from the image receiving part;
   a display part for displaying the image data sequentially output from the image receiving part and the image data recorded in the recording part at the same time;
   a control part for controlling such that (1) the image data selected from the image data recorded in the recording part in accordance with the shooting instruction, and the image data output from the image receiving part in real time are displayed on the display part at the same time, and (2) the image data selected from the image data recorded in the recording part in accordance with an instruction other than the shooting instruction, and the image data output from the image receiving part in real time are displayed on the display part at the same time;
   a position detecting part for detecting the position of the imaging apparatus when image data is recorded in the recording part; and
   a clock part for detecting the shooting data and time when the image data is recorded in the recording part;
   wherein the image data selected from the recording part in accordance with the instruction other than the shooting instruction are image data selected based on either the position detected by the position detecting part or the shooting date or time detected by the clock part.

* * * * *